(12) United States Patent
Maebayashi

(10) Patent No.: US 6,201,845 B1
(45) Date of Patent: Mar. 13, 2001

(54) DATA PROCESSING APPARATUS ADAPTED FOR DATA TRANSFER BETWEEN CIRCUIT UNITS OPERATING WITH DIFFERENT CLOCK CYCLES

(75) Inventor: Masato Maebayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/214,705

(22) Filed: Mar. 18, 1994

(30) Foreign Application Priority Data

Jun. 21, 1993 (JP) ........................................... 5-148766

(51) Int. Cl.$^7$ ............................. H04L 23/00; H04L 7/00
(52) U.S. Cl. ................................. 375/377; 375/354
(58) Field of Search ........................... 375/106, 377, 375/354; 370/103; 307/511; 328/63, 72, 74; 455/67.6

(56) References Cited

U.S. PATENT DOCUMENTS

| | | | |
|---|---|---|---|
| 4,686,484 | * | 8/1987 | Otani .................................... 327/7 |
| 4,845,437 | * | 7/1989 | Mansur et al. .................. 375/106 X |
| 4,873,703 | * | 10/1989 | Crandell et al. ................ 375/106 X |
| 5,115,455 | * | 5/1992 | Samaras et al. ..................... 375/106 |
| 5,138,633 | * | 8/1992 | Cortese ................................ 375/106 |
| 5,446,764 | * | 8/1995 | Kondo ................................. 375/354 |
| 5,835,031 | * | 11/1998 | Wolf ................................... 375/354 |

FOREIGN PATENT DOCUMENTS 4-90016   3/1992 (JP) .

* cited by examiner

*Primary Examiner*—Tesfaldet Bocure
(74) *Attorney, Agent, or Firm*—Staas & Halsey LLP

(57) ABSTRACT

A data processing apparatus includes a first circuit unit operating with first clocks of a predetermined cycle, a second circuit unit operating with second clocks of a predetermined cycle different from the first clock cycle, and a first circuit block which generates and outputs a train of pulses in accordance with the first clock cycle. The second circuit unit includes a second circuit block which receives the train of pulses output from the first circuit block, and samples the train of pulses using the second clock as a sampling signal, to thereby output the sampled train of pulses; a third circuit block which receives the train of pulses output from the second circuit block, and delays the train of pulses by a predetermined number of clocks in response to the second clock, to thereby output the delayed train of pulses; and a fourth circuit block which receives the train of pulses output from the second circuit block and the train of pulses output from the third circuit block, and effects a predetermined processing with respect to both trains of pulses, to thereby generate and output a train of pulses with a cycle approximately equal to the first clock cycle. efficiently realizes data transfer processings between circuit units operating with different clock cycles.

16 Claims, 8 Drawing Sheets

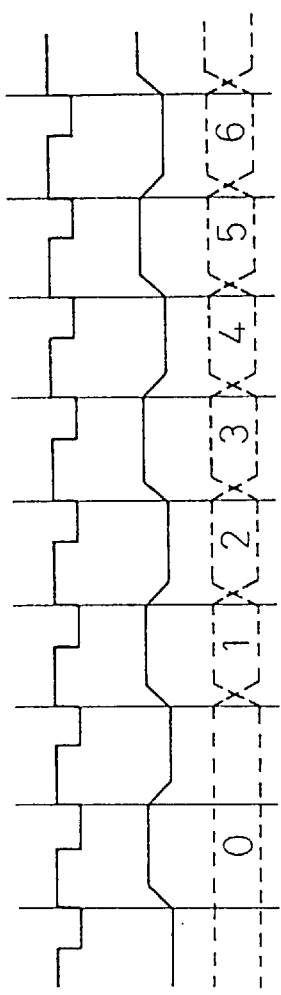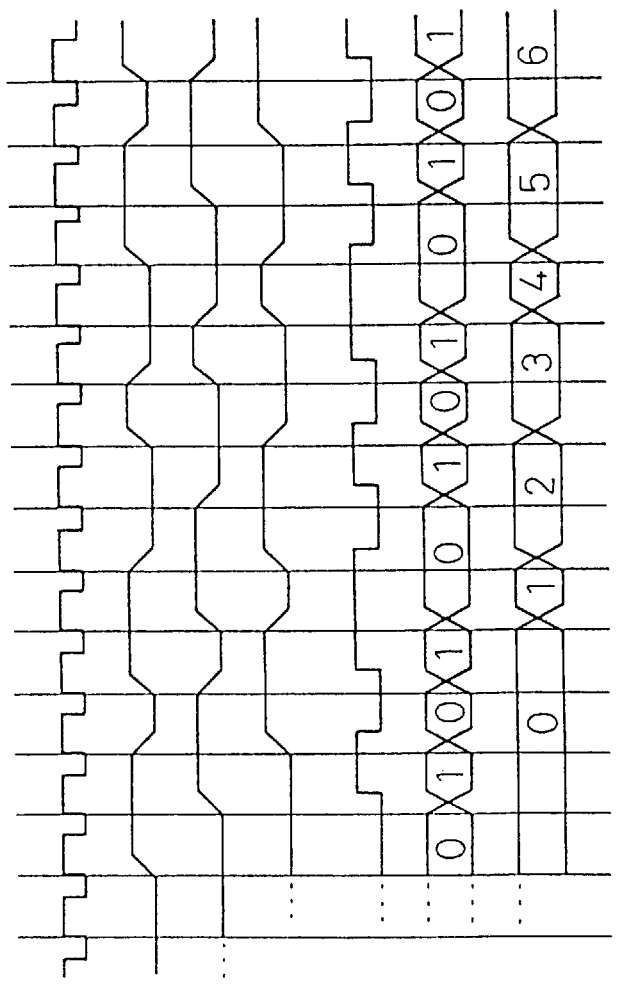
Fig. 6A  BUS CLOCK
Fig. 6B  OUTPUT (50)
Fig. 6C  IMAGINARY TIMER
Fig. 6D  INTERNAL CLOCK
Fig. 6E  OUTPUT (51)
Fig. 6F  OUTPUT (52)
Fig. 6G  OUTPUT (53)
Fig. 6H  OUTPUT (54)
Fig. 6I  OUTPUT (56)
Fig. 6J  TIMER (58)

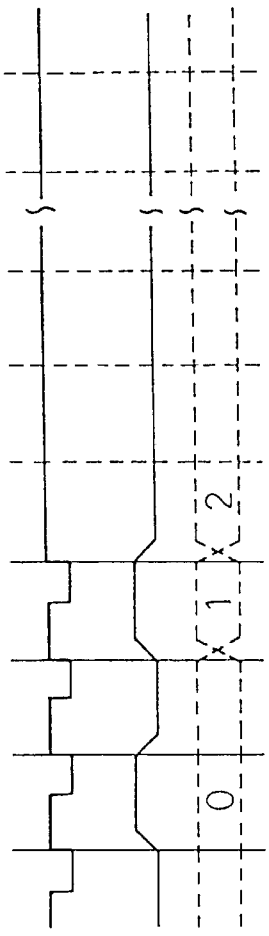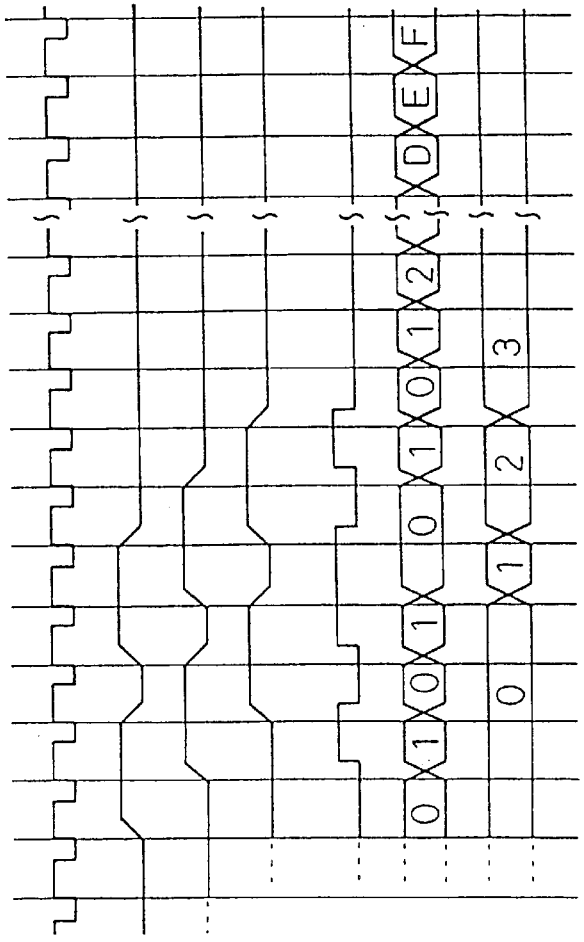
Fig. 7A    BUS CLOCK
Fig. 7B    OUTPUT (50)
Fig. 7C    IMAGINARY TIMER
Fig. 7D    INTERNAL CLOCK
Fig. 7E    OUTPUT (51)
Fig. 7F    OUTPUT (52)
Fig. 7G    OUTPUT (53)
Fig. 7H    OUTPUT (54)
Fig. 7I    OUTPUT (56)
Fig. 7J    TIMER (58)

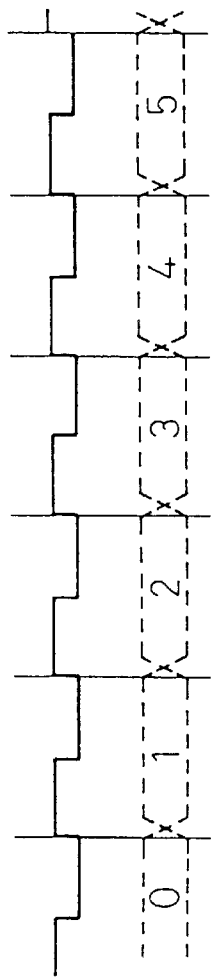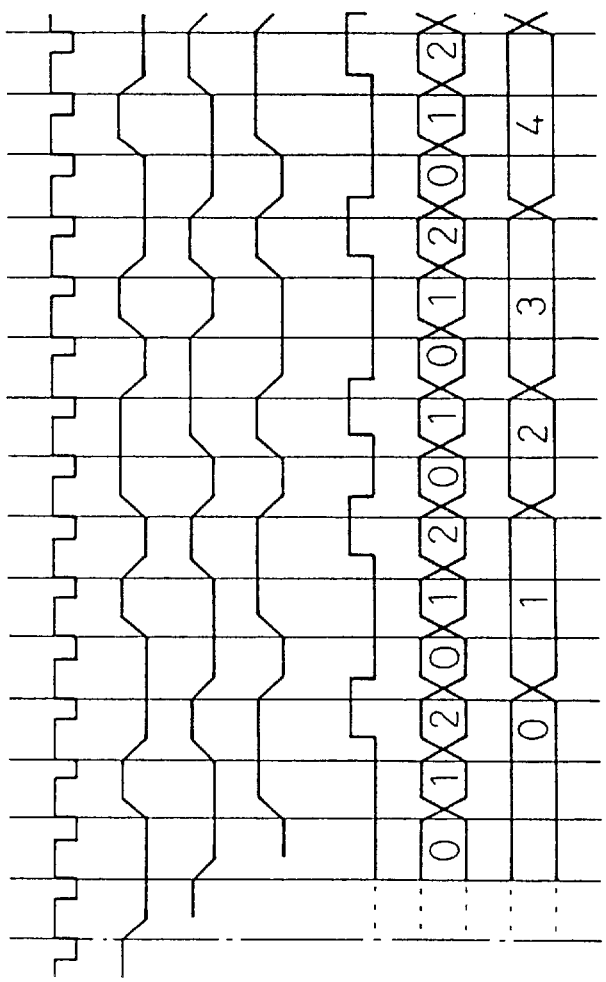
Fig. 9A  BUS CLOCK
Fig. 9B  IMAGINARY TIMER
Fig. 9C  INTERNAL CLOCK
Fig. 9D  OUTPUT (51)
Fig. 9E  OUTPUT (52)
Fig. 9F  OUTPUT (53) (INVERTED OUTPUT)
Fig. 9G  OUTPUT (59)
Fig. 9H  OUTPUT (56)
Fig. 9I  TIMER (58)

DATA PROCESSING APPARATUS ADAPTED FOR DATA TRANSFER BETWEEN CIRCUIT UNITS OPERATING WITH DIFFERENT CLOCK CYCLES

BACKGROUND OF THE INVENTION

1. Field of the Invention

The present invention relates to a data processing apparatus including a plurality of circuit units operating with different clock cycles. More particularly, it relates to a technique of efficiently carrying out a data transfer between each circuit unit.

In a data processing apparatus having a plurality of circuit units operating with different clock cycles, each circuit unit carries out a processing of monitoring respective operations of other circuit units. In this case, it is necessary to establish a system by which it is possible to realize an effective and precise processing of monitoring.

2. Description of the Related Art

For example, in a data processing apparatus including a first circuit unit operating with clocks of a first predetermined cycle and a second circuit unit operating with clocks of a second predetermined cycle different from the first clock cycle, where a data transfer is carried out from the first circuit unit to the second circuit unit, the second circuit unit needs to have a function of judging whether or not the data transfer processing has been normally carried out.

Such a function is generally realized by providing a timer in the second circuit unit which is a receiver of data, by counting a lapse of time from the start of the data transfer by means of the timer, and by judging whether or not the data transfer is completed within a predetermined lapse of time.

Such a counting processing is needed for monitoring the time required for the data transfer. Thus it should be essentially carried out by counting the number of clocks in the first circuit unit which is a transmitter of data. In the prior art, however, a timer for the counting processing has been provided in the second circuit unit which is a receiver of data, and the counting processing has been carried out by counting the number of clocks in the second circuit unit.

Namely, the prior art has adopted a method of taking into consideration the clock cycle used in the first circuit unit which is a transmitter of data, and the clock cycle used in the second circuit unit which is a receiver of data, then setting the number of clocks in the second circuit unit corresponding to the normal data transfer time, and using the set number of clocks as a reference value to thereby estimate the data transfer time.

According to the above prior art, however, where the ratio of the clock cycle in the first circuit unit to that in the second circuit unit is changed to one different from the initially expected (for example, where the clock cycle in the first circuit unit is reduced for a high speed operation in a change of design at a later stage), a problem occurs in that it is impossible to realize an accurate monitoring processing. Namely, a drawback arises in that time is over in a shorter time than the normal data transfer time initially expected, and thus it is impossible to realize an accurate monitoring processing.

To cope with the problem, another prior art has adopted a method of setting the number of clocks in the second circuit unit corresponding to the normal data transfer time, with an ample time margin. According to the method, however, a problem occurs in that, since a counting processing is carried out uselessly by time corresponding to the time margin, it is impossible to efficiently carry out the data transfer processing.

SUMMARY OF THE INVENTION

An object of the present invention is to provide a data processing apparatus by which it is possible to efficiently realize data transfer processings between circuit units operating with different clock cycles.

To attain the above object, according to the present invention, there is provided a data processing apparatus including: a first circuit unit operating with first clocks of a predetermined cycle; a second circuit unit operating with second clocks of a predetermined cycle different from the first clock cycle; and a first circuit block which generates and outputs a train of pulses in accordance with the first clock cycle, the second circuit unit including: a second circuit block which receives the train of pulses output from the first circuit block, and samples the train of pulses using the second clock as a sampling signal, to thereby output the sampled train of pulses; a third circuit block which receives the train of pulses output from the second circuit block, and delays the train of pulses by a predetermined number of clocks in response to the second clock, to thereby output the delayed train of pulses; and a fourth circuit block which receives the train of pulses output from the second circuit block and the train of pulses output from the third circuit block, and effects a predetermined processing with respect to both of the train of pulses, to thereby generate and output a train of pulses with a cycle approximately equal to the first clock cycle.

BRIEF DESCRIPTION OF THE DRAWINGS

Other objects and features of the present invention will be described hereinafter in detail by way of preferred embodiments with reference to the accompanying drawings, in which:

FIGS. 6A–6J are timing chart showing an example of the operation of the circuit shown in FIG. 5;

FIGS. 7A–7J are timing chart showing another example of the operation of the circuit shown in FIG. 5;

FIGS. 9A–9I are timing chart showing an example of the operation of the circuit shown in FIG. 8.

DESCRIPTION OF THE PREFERRED EMBODIMENTS

Figure 1:
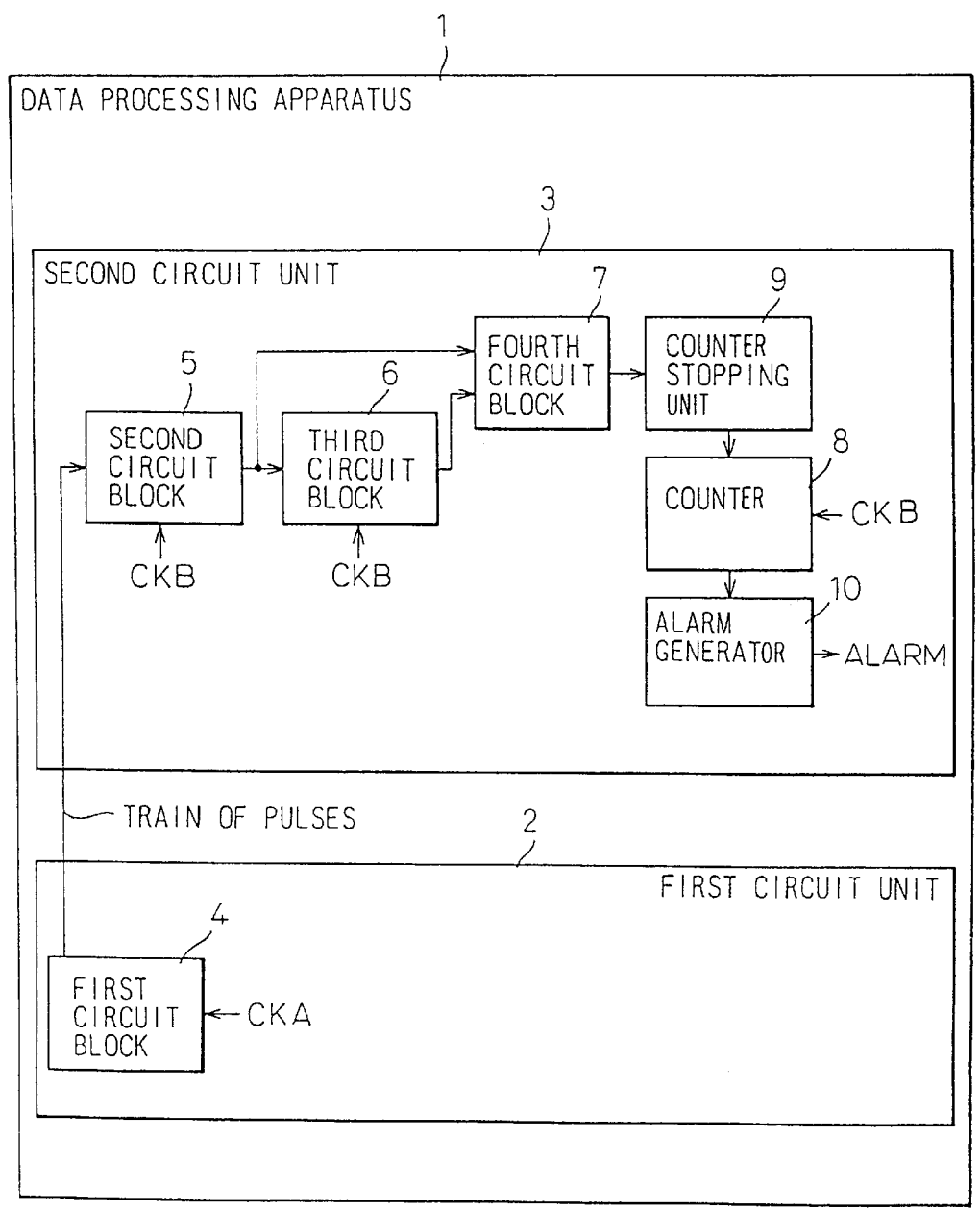
FIG. 1 is a block diagram illustrating the fundamental constitution of the data processing apparatus according to the present invention.

Throughout the description, identical reference numerals used in connection with the drawings indicate like constituent elements, and thus the repetition of explanation thereof is omitted.

FIG. 1 illustrates the fundamental constitution of the data processing apparatus according to the present invention.

In the illustration, reference 1 denotes the data processing apparatus according to the present invention. The data processing apparatus 1 includes a first circuit (or unit) 2 operating with clocks of a predetermined cycle, and a second circuit (or unit) 3 operating with clocks of a predetermined cycle different from the above clock cycle (in preferred embodiments of the present invention as stated later, with clocks of a shorter cycle than the clock cycle of the first circuit unit 2). Also, in the illustration, the clock of the first circuit unit 2 is indicated by reference CKA, and the clock of the second circuit unit 3 is indicated by reference CKB.

A first circuit (or block) 4 (i.e., a clock source), is provided, for example, in the first circuit unit 2, and generates and outputs a train of pulses in accordance with the cycle of the clock CKA of the first circuit unit 2. In another aspect of the present invention as stated later, the first circuit block 4 outputs the clock CKA of the first circuit unit 2 as it is (i.e., without effecting any processing with respect to the clock).

A second circuit (or block) 5 (i.e., a sampler circuit) is provided in the second circuit unit 3. The second circuit block 5 uses the clock CKB of the second circuit unit 3 as a sampling signal, samples the train of pulses output from the first circuit block 4, and outputs the sampled train of pulses. Also, reference 6 denotes a third circuit block which is provided in the second circuit unit 3. The third circuit block, or delay circuit, 6 receives the train of pulses output from the second circuit block 5, delays the train of pulses by a predetermined number of clocks (in preferred embodiments of the present invention as stated later, by one clock) in response to the clock CKB of the second circuit unit 3, and outputs the delayed train of pulses. Also, reference 7 denotes a fourth circuit block which is provided in the second circuit unit 3. The fourth circuit block 7, or block converter responds to the train of pulses output from the second circuit block 5 and the train of pulses output from the third circuit block 6, and generates and outputs a train of pulses with a cycle approximately equal to the clock CKA of the first circuit unit 2.

Furthermore, a counter in the second circuit unit 3, for counting the clock CKB of the second circuit unit 3. Also, reference 9 denotes a counter stopping unit provided in the second circuit unit 3, for stopping an increment of a counted value of the counter 8. Also, an alarm generating means, or generator, 10 is provided in the second circuit unit 3. When the counted value of the counter 8 reaches a predetermined value, the alarm generator 10 (generates an alarm.)

According to the constitution of FIG. 1, the first circuit block 4 generates and outputs a train of pulses in accordance with the clock CKA of the first circuit unit 2, for example, by detecting a rise of the clock CKA of the first circuit unit 2, inverting an output value thereof in response to the rise time, and repeating the inverting.

The second circuit block 5 receives the train of pulses output from the first circuit block 4, uses the clock CKB of the second circuit unit 3 as a sampling signal, and thereby samples and outputs the train of pulses. The third circuit block 6 in turn receives the train of pulses output from the second circuit block 5, delays the train of pulses by a predetermined number of clocks (for example, by one clock) in response to the clock CKB of the second circuit unit 3, and outputs the delayed train of pulses.

Next, the fourth circuit block 7 responds to the train of pulses output from the second circuit block 5 and the train of pulses output from the third circuit block 6, and for example by effecting an exclusive-OR processing with respect to the train of pulses, generates and outputs a train of pulses with a cycle approximately equal to the clock CKA of the first circuit unit 2.

Thus, in the data processing apparatus 1 including the first and second circuit units operating with the clocks CKA and CKB, respectively, of different predetermined cycles, the second circuit unit 3 has the function of generating a train of pulses with a cycle approximately equal to the clock CKA of the first circuit unit 2, within the self unit. Accordingly, it is possible to accurately set a time used for the judgement of normality or abnormality of the data transfer from the first circuit unit 2, without any useless time margin. As a result, it is possible to efficiently carry out the data transfer processing from the first circuit unit 2 to the second circuit unit 3.

Next, the preferred embodiments of the present invention will be explained in detail with reference to FIGS. 2 to 9.

Figure 2:
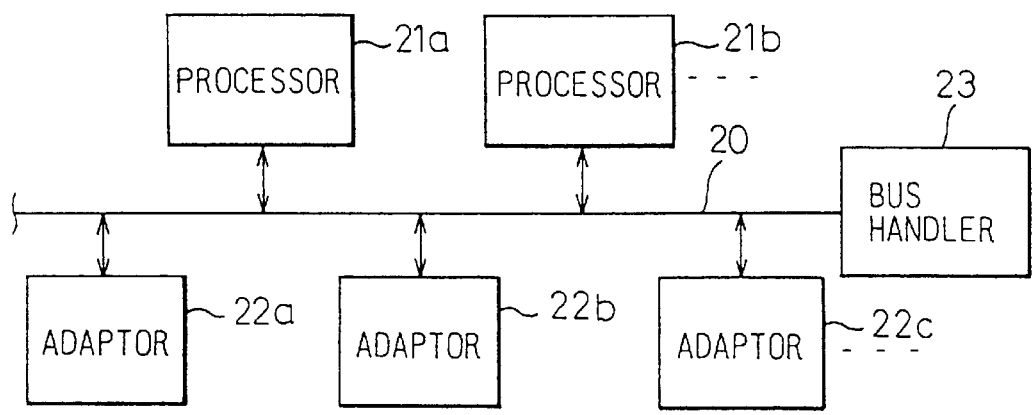
FIG. 2 is a block diagram illustrating a system constitution of the data processing apparatus according to the present invention.

FIG. 2 illustrates a system of the data processing apparatus 1 according to the present invention.

In the illustration, reference 20 denotes a common bus; references 21a, 21b, ..., each a processor connected to the common bus 20; references 22a, 22b, 22c, ..., each an adaptor connected to the common bus 20; and reference 23 a bus handler connected to the common bus 20. The bus handler 23 is a circuit for feeding clocks to each module (processors 21a, 21b, ..., adaptors 22a, 22b, 22c, ...) connected to the common bus 20, and for effecting arbitration upon receipt of a bus occupation request signal from each module, to thereby issue an occupation acknowldgement signal.

Figure 3:
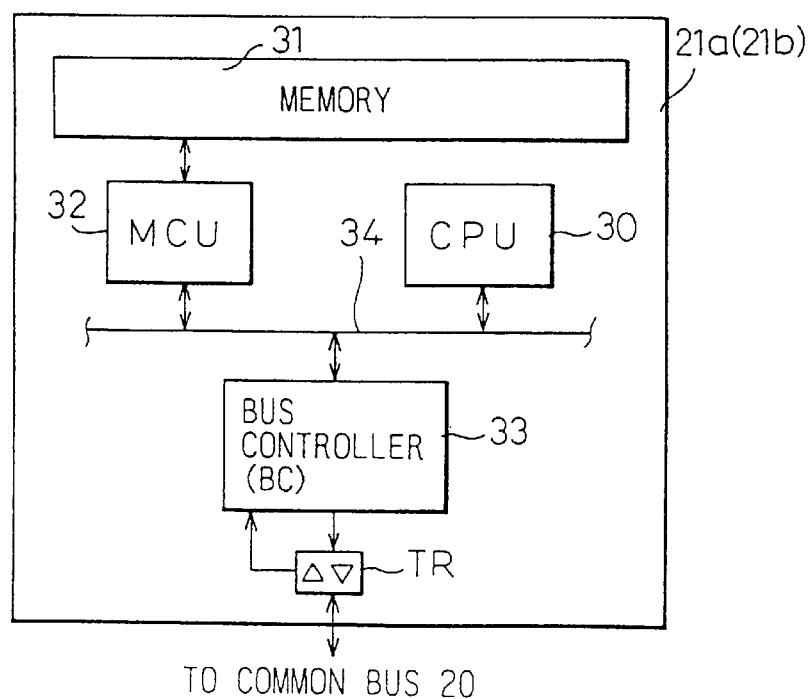
FIG. 3 is a block diagram illustrating the constitution of the processor shown in FIG. 2.

FIG. 3 illustrates the processor 21a (21b). As illustrated, the processor 21a (21b) includes a central processing unit (CPU) 30, a memory 31, a memory control unit (MCU) 32, and a bus controller (BC) 33. Also, respective units are connected via an internal bus 34 to each other.

Figure 4:
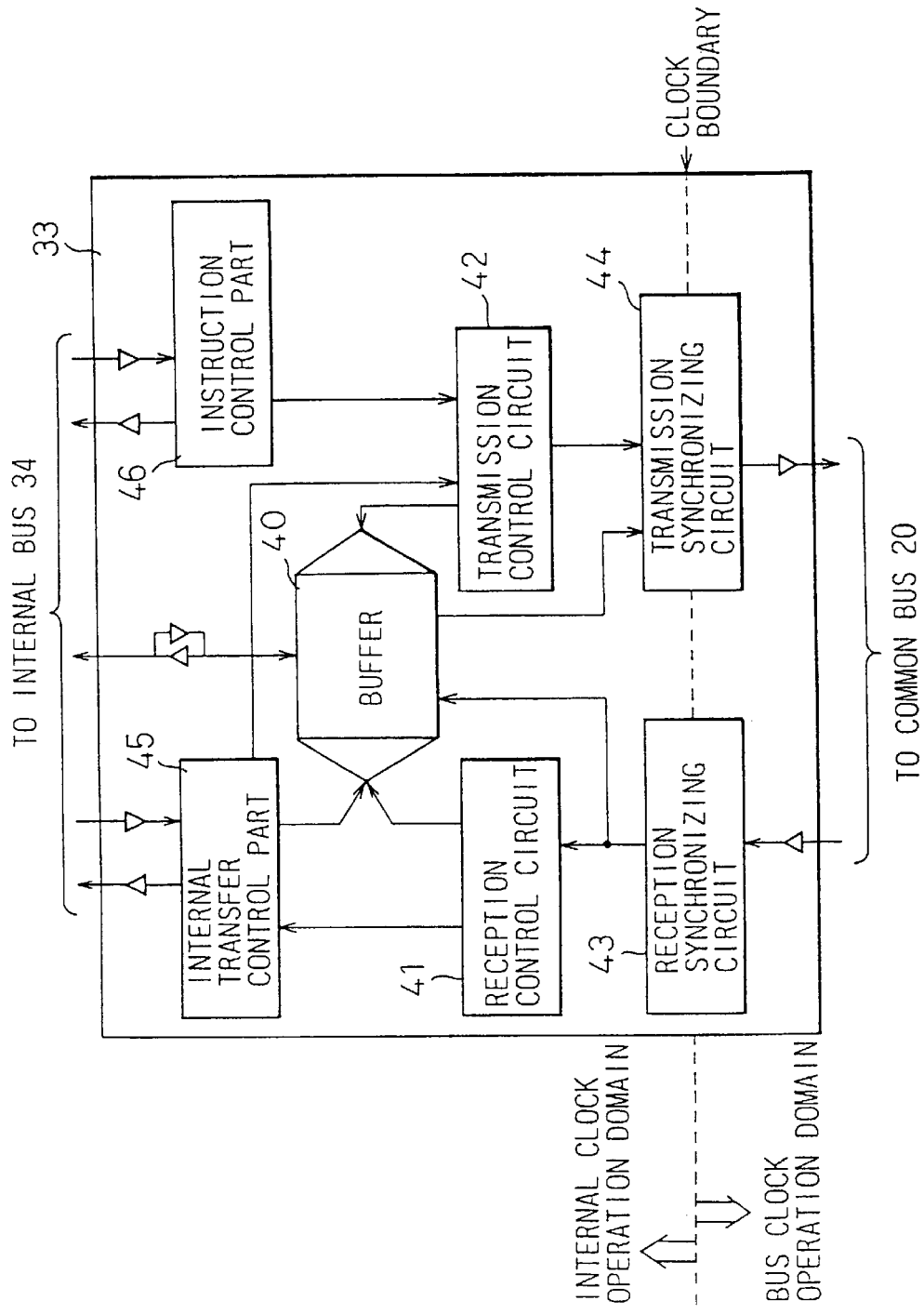
FIG. 4 is a block diagram illustrating the constitution of the bus controller shown in FIG. 3.

FIG. 4 illustrates the bus controller 33 provided in the processor 21a (21b). As illustrated, the bus controller 33 includes by a buffer 40, a reception control circuit 41, a transmission control circuit 42, a reception synchronizing circuit 43, a transmission synchronizing circuit 44, an internal transfer control part 45, and a command or instruction control part 46. The bus controller 33 is operated in response to two clocks, i.e., a bus clock fed from the bus handler 23 via the common bus 20, and an internal clock generated within the processor 21a (21b) and having a shorter cycle than that of the bus clock. The bus controller 33 has functions of transmitting commands or instructions from the CPU 30 to the adaptors 22a, 22b, 22c, ..., receiving data transfer requests from each adaptor to thereby carry out the data transfer to and from the memory 31, or transmitting interrupt processings by each adaptor to the CPU 30.

In FIG. 4, the portion indicated by a broken line represents a clock boundary. The portion in the side of the common bus 20 from the clock boundary corresponds to a portion operated by the bus clock (for convenience's sake, referred to as a bus clock operation domain), and the portion in the side of the internal bus 34 from the clock boundary corresponds to a portion operated by the internal clock (for convenience's sake, referred to as an internal clock operation domain).

Figure 5:
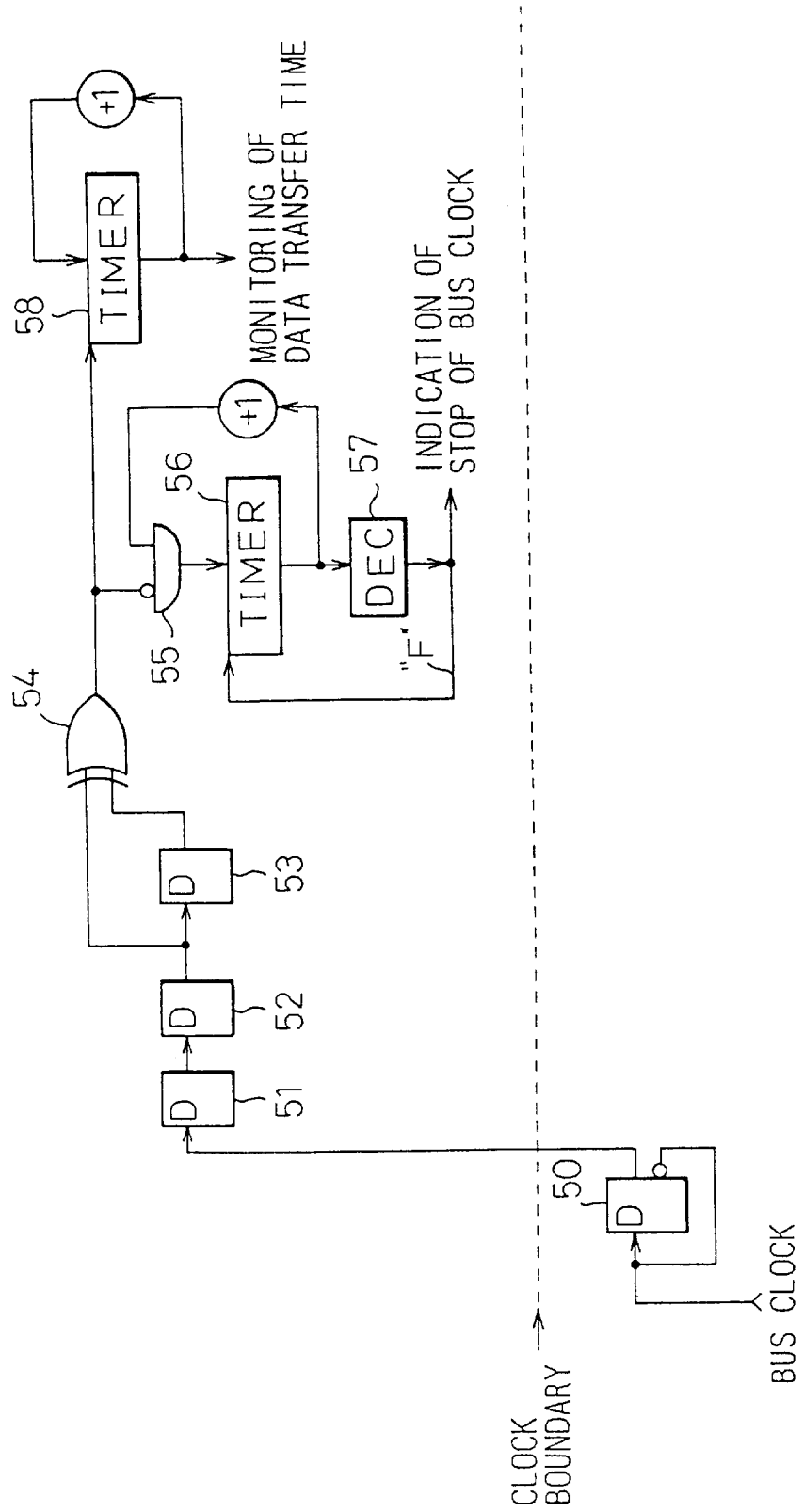
FIG. 5 is a diagram illustrating the circuit constitution of the portion relevant to the present invention, of the bus controller in an embodiment of the present invention.

FIG. 5 illustrates the portion of the bus controller 33 relevant to the present invention in an embodiment of the present invention.

In the illustration, the portion indicated by a broken line represents the above clock boundary. The portion in the upper side of the clock boundary corresponds to the internal clock operation domain, and the portion in the lower side of the clock boundary corresponds to the bus clock operation domain.

Reference 50 denotes a delay (D)-type flip-flop provided in the bus clock operation domain. The D-type flip-flop inputs a logic level at an inverted output terminal thereof to a data (D) terminal thereof, latches a logic level input to the D terminal at a rise of the bus clock, and outputs the latched logic level from an output terminal thereof.

Reference 51 denotes a D-type flip-flop provided in the internal clock operation domain. The D-type flipflop inputs a logic level at the output terminal of the D-type flip-flop 50 to a D terminal thereof, latches a logic level input to the D terminal at a rise of the internal clock, and outputs the latched logic level from an output terminal thereof. Reference 52 denotes a D-type flip-flop provided in the internal clock operation domain. The D-type flip-flop inputs a logic level at the output terminal of the D-type flip-flop 51 to a D terminal thereof, latches a logic level input to the D terminal at a rise of the internal clock, and outputs the latched logic level from an output terminal thereof. Also, reference 53 denotes a D-type flip-flop provided in the internal clock operation domain. The D-type flip-flop inputs a logic level at the output terminal of the D-type flip-flop 52 to a D terminal thereof, latches a logic level input to the D terminal at a rise of the internal clock, and outputs the latched logic level from an output terminal thereof.

Reference 54 denotes an exclusive-OR circuit (hereinafter referred to as an EOR circuit) provided in the internal clock operation domain. The EOR circuit responds to a logic level at the output terminal of the D-type flip-flop 52 and to a logic level at the output terminal of the D-type flip-flop 53, and makes and outputs an exclusive-OR of the two logic levels. Also, reference 55 denotes an AND circuit provided in the internal clock operation domain, which is provided with AND gates corresponding to the number of bits (e.g., four bits) of a timer 56 stated later. When the EOR circuit 54 outputs "0" level, the AND circuit 55 outputs a value added by "1" to the present counted value of the timer 56, and when the EOR circuit 54 outputs "1" level, the AND circuit 55 outputs "0" level.

Reference 56 denotes the above timer provided in the internal clock operation domain, which is constituted by, for example, a four-bit counter. When a decoded output level of a decoder 57 stated later indicates "1" (i.e., a counted value of the timer 56 means hexadecimal "F") at a rise of the internal clock, the timer 56 holds its counted value. When a decoded output level of the decoder 57 indicates "0" (i.e., a counted value of the timer 56 means a value other than "F"), the timer 56 reads an output value of the AND circuit 55. Reference 57 denotes the above decoder provided in the internal clock operation domain. When a counted value of the timer 56 indicates "F", the decoder 57 stops the count processing of the timer 56, and outputs a signal indicating a stop of the bus clock (i.e., fault signal).

Also, reference 58 denotes a timer provided in the internal clock operation domain. When the EOR circuit 54 outputs "1" level at a rise of the internal clock, the timer 58 counts up its counted value. When the EOR circuit 54 outputs "0" level, the timer 58 continues to hold its counted value.

Next, the operation of the circuit according to the embodiment shown in FIG. 5 will be explained with reference to the operational timing charts shown in FIGS. 6A–6J and 7A–7J.

As shown in the timing chart of FIGS. 6A–6J, the D-type flip-flop 50 provided in the bus clock operation domain repeats the processing of inverting a logic level at the output terminal in response to a rise of the bus clock, and thus generates a train of pulses with a cycle twice the cycle of the bus clock. Note, an "imaginary timer" shown in FIG. 6 indicates an imaginary timer which counts the bus clock to thereby count a lapse of time.

As shown in the timing charts of FIGS. 6A–6J, the D-type flip-flop 51 receives the train of pulses generated by the D-type flip-flop 50, and uses the internal clock of a shorter cycle than the bus clock, as a sampling signal, to thereby sample the train of pulses generated by the D-type flip-flop 50. The D-type flip-flop 52 in turn delays the train of pulses output from the D-type flip-flop 51, by one internal clock. Furthermore, the D-type flip-flop 53 delays the train of pulses output from the D-type flip-flop 52, by one internal clock.

Thus, when the D-type flip-flops 52 and 53 outputs the respective train of pulses, the EOR circuit 54 makes an exclusive-OR of the output values of the D-type flip-flops 52 and 53. Namely, as shown in the timing chart of FIG. 6, the EOR circuit 54 generates a pulse of "1" level when one of the output values of the D-type flip-flops 52 and 53 indicates "1" level and the other indicates "0" level, and the EOR circuit 54 generates a pulse of "0" level when both of the output values of the D-type flip-flops 52 and 53 indicate "1" level or "0" level.

Upon receipt of the train of pulses generated by the EOR circuit 54, the timer 58 counts up its counted value when the EOR circuit 54 outputs "1" level at a rise of the internal clock, and it continues to hold its counted value when the EOR circuit 54 outputs "0" level at a rise of the internal clock. Thus, as shown in the timing charts of FIGS. 6A–6J, the timer 58 counts a lapse of time according to substantially the same count-up mode as that of the imaginary timer provided in the bus clock operation domain.

In the above operation, when the bus clock is normally generated, the timer 56 does not effect a count-up processing exceeding a counted value of "1" as shown in the timing charts of FIGS. 6A–6J, since the EOR circuit 54 repeatedly continues to output "1" level or "0" level. However, when the bus clock is not normally generated, the timer 56 continues to count up its counted value (1, 2, . . . D, E, F, . . . ) as shown in the timing charts of FIGS. 7A–7J, since the EOR circuit 54 repeatedly continues to output "0" level. In response to the count-up processing, the decoder 57 outputs a signal indicating a stop of the bus clock (i.e., fault signal) when the counted value of the timer 56 indicates "F".

Thus, in the internal clock operation domain of the bus controller 33, it is possible to count a lapse of time according to substantially the same count-up mode as that of the imaginary timer provided in the bus clock operation domain, and thus to accurately detect a presence or absence of any fault in the bus clock.

Figure 8:
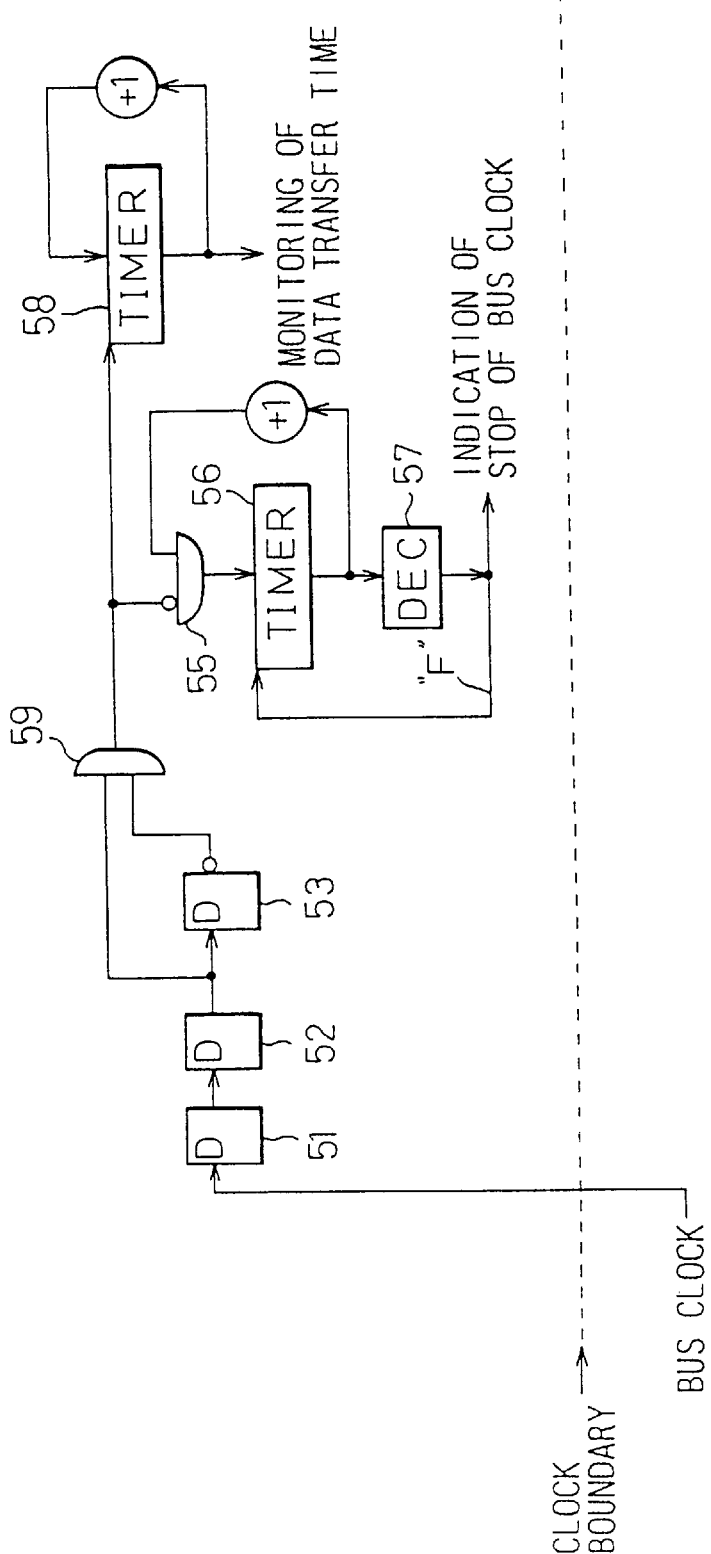
FIG. 8 is a diagram illustrating the circuit constitution of the portion relevant to the present invention, of the bus controller in another embodiment of the present invention.

FIG. 8 illustrates of the relevant portion, of the bus controller 33 of the present invention in another embodiment of the present invention.

In the present embodiment, the D-type flip-flop 50 in FIG. 5 is omitted, and instead the bus clock is directly input to the D terminal of the D-type flip-flop 51. Also, the EOR circuit 54 in FIG. 5 is substituted by an AND circuit 59, which inputs a logic level at the output terminal of the D-type flip-flop 52 and a logic level at the inverted output terminal (in the embodiment of FIG. 5, the output terminal) of the D-type flip-flop 53. An output of the AND circuit 59 is input to the AND circuit 55 and the timer 58.

FIGS. 9A–9I are is a timing chart showing the operation of the circuit according to the present embodiment. As shown in the timing chart, in the same manner as in the aforementioned embodiment (see FIGS. 5 to 7), in the internal clock operation domain of the bus controller 33, it is possible to count a lapse of time according to substantially the same count-up mode as that of the imaginary timer provided in the bus clock operation domain, and thus to accurately detect a presence or absence of any fault in the bus clock.

Although the present invention has been disclosed and described by way of two embodiments, it is apparent to those skilled in the art that other embodiments and modifications of the present invention are possible without departing from the essential features thereof.

What is claimed is:

1. A data processing apparatus comprising:
   a first circuit operating with a first clock of a first clock cycle;
   a second circuit operating with a second clock of a second clock cycle different from the first clock cycle; and
   a first clock source which generates and outputs a train of pulses in accordance with the first clock cycle,
   the second circuit including:
   a sampler circuit which receives the train of pulses output from the first clock source and samples the train of pulses, using the second clock as a sampling signal, and outputs a sampled train of pulses;
   a delay circuit which receives the sampled train of pulses, output from the sampler circuit, and delays the sampled train of pulses by a predetermined number of clock cycles in response to the second clock and thereby outputs a delayed train of pulses; and
   a clock converter which receives the sampled train of pulses output from the sampler circuit and the delayed train of pulses output from the delay circuit, and effects a predetermined logic operation with respect to both of the sampled and delayed trains of pulses, and thereby generates and outputs a further train of pulses having a clock cycle approximately equal to the first clock cycle.

2. The data processing apparatus as set forth in claim 1, wherein the second clock cycle is shorter than the first clock cycle.

3. The data processing apparatus as set forth in claim 2, wherein the first clock source outputs the first clock.

4. The data processing apparatus as set forth in claim 3, wherein the second circuit further comprises:
   a counter counting the second clock;
   a count stopping unit stopping an increment of a counted value of the counter during a period in which the clock converter outputs a further train of pulses with a cycle approximately equal to the first clock cycle; and
   an alarm generator outputting an alarm signal indicating that the counted value of the counter has reached a predetermined value.

5. The data processing apparatus as set forth in claim 4; wherein the delay circuit includes a D-type flip-flop which delays the sampled train of pulses, output from the sampler circuit, by one clock cycle in response to the second clock and thus outputs the delayed train of pulses.

6. The data processing apparatus as set forth in claim 5, wherein the clock converter includes an AND circuit responsive to an inverted output signal of the D-type flip-flop and the sampled train of pulses output from the sampler circuit.

7. The data processing apparatus as set forth in claim 2, wherein the first clock source is provided in the first circuit.

8. The data processing apparatus as set forth in claim 2, wherein the second circuit further comprises:
   a counter counting the second clock;
   a count stopping unit stopping an increment of a counted value of the counter during a period in which the clock converter outputs a further train of pulses with a cycle approximately equal to the first clock cycle; and
   an alarm generator outputting an alarm signal indicating that the counted value of the counter has reached a predetermined value.

9. The data processing apparatus as set forth in claim 8, wherein the delay circuit includes a D-type flip-flop which delays the sampled train of pulses output from the sampler circuit by one clock in response to the second clock and thus outputs the delayed train of pulses.

10. The data processing apparatus as set forth in claim 9, wherein the clock converter includes an exclusive-OR circuit responsive to an output signal of the D-type flip-flop and the sampled train of pulses output from the sampler circuit.

11. A method as set forth in claim 1, wherein the second clock cycle is shorter than the first clock cycle.

12. The method as recited in claim 2, further comprising:
    counting the second clock;
    stopping an increment of a counted value of the second clock during a period in which the logic operation produces a further train of pulses having a clock cycle approximately equal to the first clock cycle; and
    generating an alarm signal indicating that the counted value of the second clock has reached a predetermined value.

13. A method as recited in claim 12, further comprising:
    delaying the sample train of pulses by one clock in response to the second clock and outputting the delayed train of pulses.

14. A method as set forth in claim 13, further comprising:
    performing the logic operation in an exclusive or circuit, responsive to the delayed train of pulses output from the D-type flip flop and to the sampled train of pulses.

15. A data processing method for carrying out data transfers between first and second circuits respectively operating with first and second clocks of first and second, different, clock cycles, comprising:
    generating a train of pulses in accordance with the first clock cycle;
    sampling the train of pulses of the first clock cycle and, using the second clock as a sampling signal, outputting a sampled train of pulses;
    delaying the sampled train of pulses by a predetermined number of clock cycles in response to the second clock and outputting a delayed train of pulses; and
    performing a logic operation on the sampled and delayed trains of pulses so as to generate and output a further train of pulses having a clock cycle approximately equal to the first clock signal.

16. A method as set forth in claim 15, further comprising:
    counting the second clock;
    stopping an increment of a counted value of the second clock during a period in which the logic operation produces a further train of pulses having a clock cycle approximately equal to the first clock cycle; and
    generating an alarm signal indicating that the counted value of the second clock has reached a predetermined value.

* * * * *

UNITED STATES PATENT AND TRADEMARK OFFICE
CERTIFICATE OF CORRECTION

PATENT NO.   : 6,201,845 B1                                    Page 1 of 1
DATED        : March 13, 2001
INVENTOR(S)  : Masato Maebayashi It is certified that error appears in the above-identified patent and that said Letters Patent is hereby corrected as shown below:

<u>Title page, [57] Abstract,</u>
Line 20, after "cycle." insert -- The present invention --.

Signed and Sealed this

Twenty-first Day of August, 2001

*Attest:*

*Attesting Officer*

NICHOLAS P. GODICI
*Acting Director of the United States Patent and Trademark Office*